US010082912B2

(12) United States Patent
Onishi

(10) Patent No.: US 10,082,912 B2
(45) Date of Patent: Sep. 25, 2018

(54) INFORMATION PROCESSING FOR ENHANCING INPUT MANIPULATION OPERATIONS

(75) Inventor: Yusuke Onishi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 99 days.

(21) Appl. No.: 14/114,825

(22) PCT Filed: Jun. 12, 2012

(86) PCT No.: PCT/JP2012/064984
§ 371 (c)(1),
(2), (4) Date: Oct. 30, 2013

(87) PCT Pub. No.: WO2012/173107
PCT Pub. Date: Dec. 20, 2012

(65) Prior Publication Data
US 2014/0062958 A1    Mar. 6, 2014

(30) Foreign Application Priority Data

Jun. 16, 2011  (JP) .................................. 2011-134264

(51) Int. Cl.
*G06F 3/044*     (2006.01)
*G06F 3/041*     (2006.01)
*G06F 3/0488*    (2013.01)

(52) U.S. Cl.
CPC ............ *G06F 3/044* (2013.01); *G06F 3/0416* (2013.01); *G06F 3/04886* (2013.01); *G06F 2203/04108* (2013.01)

(58) Field of Classification Search
CPC ........ G06F 3/041; G06F 3/044; G06F 3/0416; G06F 3/04886

(Continued)

(56) References Cited

U.S. PATENT DOCUMENTS 6,323,846 B1* 11/2001 Westerman ........... G06F 3/0235
                                                       345/173
2005/0052430 A1*  3/2005 Shahoian .............. G06F 1/1616
                                                       345/173

(Continued)

FOREIGN PATENT DOCUMENTS

JP      2000-039964 A     2/2000
JP      2002-351613 A    12/2002

(Continued)

OTHER PUBLICATIONS

Office Action for EP Patent Application No. 12800551.9, dated Sep. 23, 2016, pp. 07.

*Primary Examiner* — Amare Mengistu
*Assistant Examiner* — Jennifer Zubajlo
(74) *Attorney, Agent, or Firm* — Chip Law Group

(57) ABSTRACT

A sensor unit 11 generates a sensor signal according to proximity and contact of a manipulation object. A proximity detecting unit 12 performs proximity detection of the manipulation object, on the basis of the sensor signal. When a plurality of manipulation objects are detected by the proximity detection, a determining unit 13 sets a priority order to the detected manipulation objects and adopts a proximity detection result on the basis of the set priority order. For this reason, even though the plurality of manipulation objects are detected, the proximity detection result having the high priority order is adopted, so that erroneous detection can be prevented and an input manipulation can be correctly performed.

19 Claims, 12 Drawing Sheets

(58) Field of Classification Search
USPC .................................................. 345/173, 174
See application file for complete search history.

(56) References Cited

U.S. PATENT DOCUMENTS

| | | | | |
|---|---|---|---|---|
| 2006/0112353 A1* | 5/2006 | Okamoto | ............... | G06F 3/0488 715/810 |
| 2007/0152976 A1 | 7/2007 | Townsend et al. | | |
| 2007/0287494 A1* | 12/2007 | You | ............... | H04M 1/23 455/550.1 |
| 2008/0007434 A1* | 1/2008 | Hristov | ............... | G06F 3/0237 341/22 |
| 2008/0170042 A1* | 7/2008 | Yoon | ............... | G06F 3/0416 345/173 |
| 2008/0305836 A1* | 12/2008 | Kim | ............... | G06F 3/04886 455/564 |
| 2009/0021491 A1* | 1/2009 | Kawamura | ............... | B60K 35/00 345/173 |
| 2009/0174679 A1* | 7/2009 | Westerman | ............... | G06F 3/03547 345/173 |
| 2009/0201266 A1* | 8/2009 | Hashimoto | ............... | A61B 8/00 345/173 |
| 2009/0247234 A1* | 10/2009 | Kim | ............... | G06F 3/041 455/566 |
| 2009/0251434 A1* | 10/2009 | Rimon | ............... | G06F 1/30 345/173 |
| 2010/0051433 A1 | 3/2010 | Kong et al. | | |
| 2010/0053095 A1* | 3/2010 | Wu | ............... | G06F 3/0418 345/173 |
| 2010/0182018 A1* | 7/2010 | Hazelden | ............... | B60K 35/00 324/663 |
| 2010/0283750 A1* | 11/2010 | Kang | ............... | G06F 3/0416 345/173 |
| 2010/0328222 A1* | 12/2010 | Wong | ............... | G06F 3/03547 345/173 |
| 2011/0025619 A1* | 2/2011 | Joguet | ............... | G06F 1/3262 345/173 |
| 2011/0069021 A1* | 3/2011 | Hill | ............... | G06F 3/0416 345/173 |
| 2012/0105481 A1* | 5/2012 | Baek | ............... | G06F 3/0418 345/652 |
| 2013/0154983 A1* | 6/2013 | Christiansson | ............... | G06F 3/0416 345/173 |
| 2013/0300688 A1* | 11/2013 | Inamoto | ............... | G06F 3/0416 345/173 |
| 2014/0071090 A1* | 3/2014 | Onishi | ............... | G06F 3/0416 345/174 |
| 2015/0042586 A1* | 2/2015 | Arai | ............... | G06F 3/0412 345/173 |

FOREIGN PATENT DOCUMENTS

| | | |
|---|---|---|
| JP | 2005-234039 A | 9/2005 |
| JP | 2007-267388 A | 10/2007 |
| JP | 2009-217814 A | 9/2009 |
| JP | 2010-055614 A | 3/2010 |
| JP | 2010-134895 A | 6/2010 |
| JP | 2011-501261 A | 1/2011 |
| JP | 2011-028603 A | 2/2011 |

* cited by examiner

FIG. 1
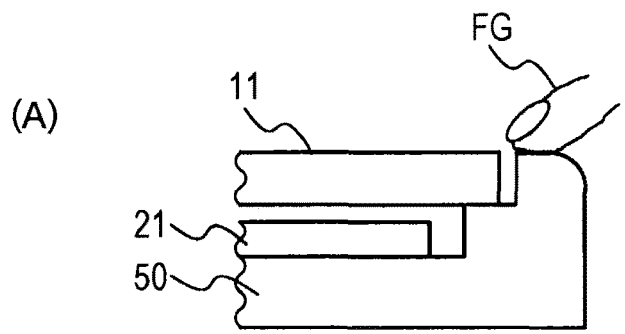
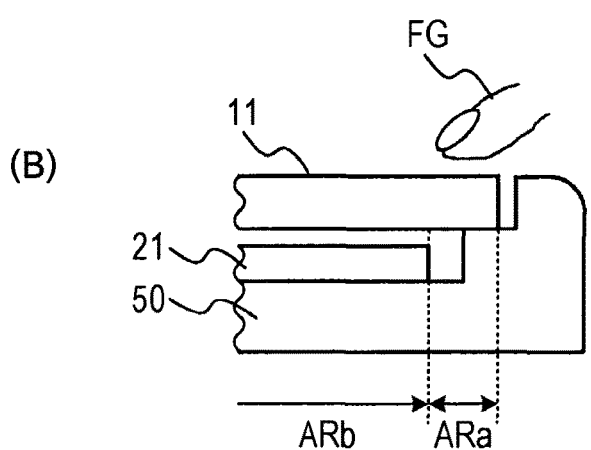
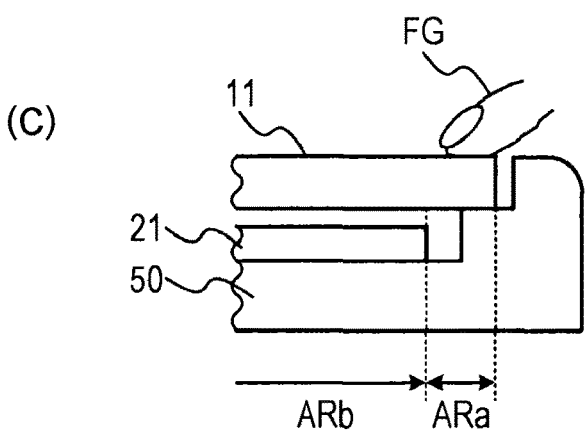

FIG. 6
(A)
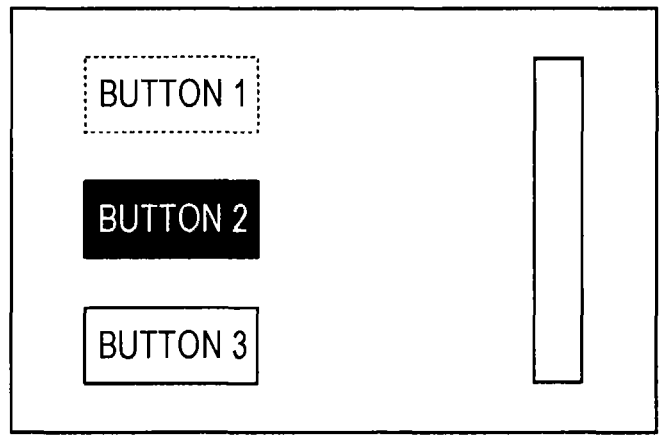
(B)
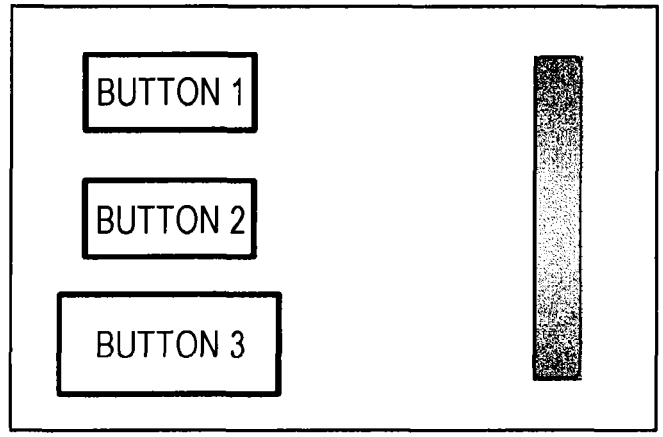

FIG. 12
(A)
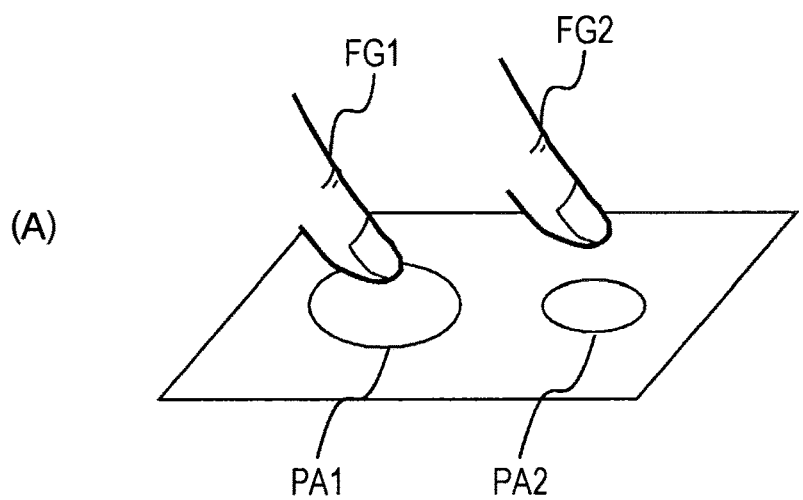
(B)
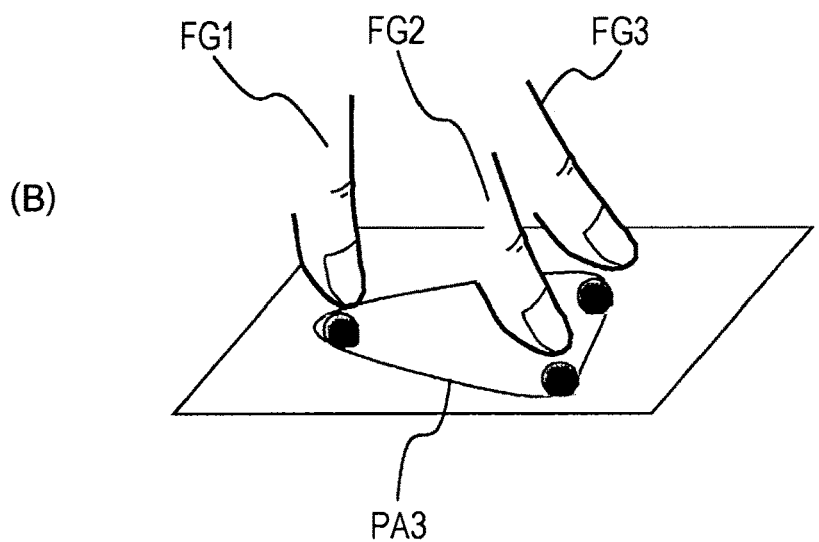

*FIG. 13*
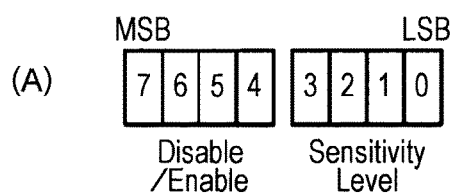
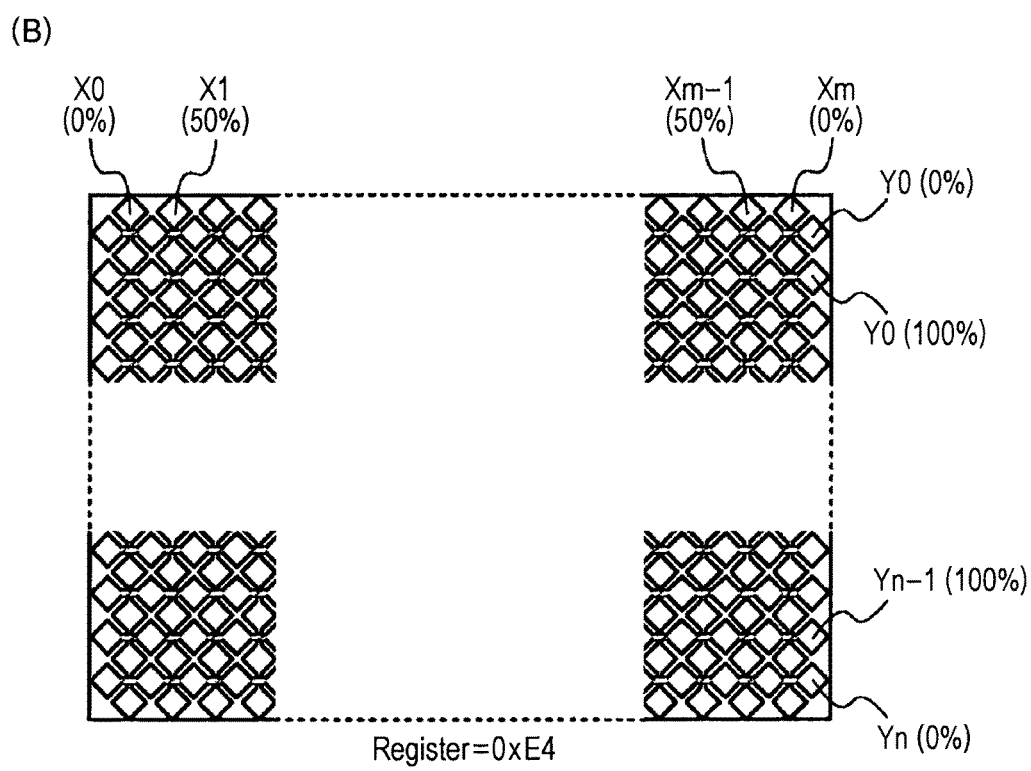

INFORMATION PROCESSING FOR ENHANCING INPUT MANIPULATION OPERATIONS

TECHNICAL FIELD

The technology relates to an information processing apparatus, an information processing method, and a program. More particularly, the technology provides an information processing apparatus, an information processing method, and a program that enable input manipulation to be correctly performed.

BACKGROUND ART

Recently, in various electronic apparatuses such as a mobile phone, a portable information terminal, and a portable music player, input manipulation can be performed by providing a capacitive or resistive touch panel. In the capacitive touch panel, a change in capacitance generated by causing a manipulation object such as a finger or a contact pen to contact a touch panel manipulation surface is detected, so that a contact position is detected, as described in Patent Documents 1 and 2.

CITATION LIST

Patent Document

Patent Document 1: JP 2008-9750 A
Patent Document 2: JP 2009-069035 A

SUMMARY OF THE INVENTION

Problems to be Solved by the Invention

Meanwhile, in the capacitive touch panel, even when the capacitance is changed by not only the input manipulation but also other manipulations, it may be erroneously detected that the input manipulation has been performed. FIG. 1 illustrates a schematic cross-sectional view of an information processing apparatus using a touch panel. A display unit 21 is provided in a casing 50 of the information processing apparatus and a touch panel to be a sensor unit 11 is provided on a side of a display surface of the display unit 21. Here, for example, when a user holds the casing 50 as illustrated in FIG. 1(A), the capacitance changes and it may be erroneously detected that the input manipulation has been performed in an active region ARb positioned proximally to a finger FG. In addition, even when the finger FG approaches a non-active region ARa as illustrated in FIG. 1(B) or the finger contacts the non-active region ARa as illustrated in FIG. 1(C), it may be erroneously detected that the input manipulation has been performed, similar to the above case.

In addition, when the finger FG is made to come close to the active region ARb, if other finger comes close to the active region ARb, a position of other finger may be erroneously determined as a manipulation position.

Therefore, it is an object of the technology to provide an information processing apparatus, an information processing method, and a program that enable input manipulation to be correctly performed.

According to a first aspect of the present technology, there is provided an information processing apparatus including a sensor unit that generates a sensor signal according to proximity and contact of a manipulation object, a proximity detecting unit that performs proximity detection of the manipulation object, on the basis of the sensor signal, and a determining unit that, when a plurality of manipulation objects are detected by the proximity detection, sets a priority order to the detected manipulation objects and adopts a proximity detection result on the basis of the set priority order.

In the present technology, the sensor unit is, for example, a capacitive touch panel. The proximity detection of the manipulation object is performed by the proximity detecting unit, on the basis of the sensor signal generated by the sensor unit according to the proximity and the contact of the manipulation object. In the determining unit, when the plurality of manipulation objects are detected by the proximity detection, the priority order is set to the detected manipulation objects. For example, the priority order of a manipulation object positioned in a predetermined region provided in a region where detection of the contact of the manipulation object is enabled becomes high. In addition, when a plurality of manipulation objects are positioned in the predetermined region, the priority order of a manipulation object in which the signal strength of the sensor signal is high becomes high. The proximity detection result is adopted on the basis of the priority order set as described above. In the determining unit, when a detection size of the manipulation object detected by the proximity detection is more than a threshold value, the manipulation object is determined as invalidity. In addition, an individual process or an integration process of proximity detection results is executed, when a plurality of manipulation objects are detected by the proximity detection. For example, a process for performing region display corresponding to each manipulation object by the display unit, on the basis of the proximity detection results of the plurality of detected manipulation objects, and setting a display size of the region display according to the signal strength of the sensor signal is executed as the individual process and a process for displaying a region surrounded by positions shown by the plurality of proximity detection results by the display unit, on the basis of the proximity detection results of the plurality of detected manipulation objects, is executed as the integration process.

In addition, in the determining unit, the proximity detection result is validated, when a detection position detected by the proximity detection is, for example, in a manipulatable region provided in the region where the detection of the contact of the manipulation object is enabled, and a detection invalidation flag is set and the proximity detection result is invalidated, when the detection position is outside the manipulatable region. When the detection invalidation flag is set, because the detection position was outside the manipulatable region, and when the detection position moves and becomes a position of a detection invalidation flag release region in the manipulatable region, the detection invalidation flag is released and the proximity detection result is validated. In addition, when the manipulation object is detected by the proximity detecting unit, the manipulatable region is displayed identifiably by the display unit.

In addition, detection sensitivity of the proximity detection in the proximity detecting unit is controlled by a proximity detection control unit and detection sensitivity of the side of an end of the region where the detection of the contact of the manipulation object is enabled is decreased, such that the detection sensitivity becomes lower than the detection sensitivity of the other portion.

According to a second aspect of the present technology, there is provided an information processing method including a process of generating a sensor signal according to proximity and contact of a manipulation object, a process of performing proximity detection of the manipulation object, on the basis of the sensor signal, and a process of, when a plurality of manipulation objects are detected by the proximity detection, setting a priority order to the detected manipulation objects and adopting a proximity detection result on the basis of the set priority order.

According to a third aspect of the present technology, there is provided a program for causing a computer to execute a step of performing proximity detection of a manipulation object, on the basis of a sensor signal generated by a sensor unit according to proximity and contact of the manipulation object and a step of, when a plurality of manipulation objects are detected by the proximity detection, setting a priority order to the detected manipulation objects and adopting a proximity detection result on the basis of the set priority order.

The program according to the present technology is, for example, a program that can be provided to a general-purpose computer/system executing various programs and codes by a storage medium or a communication medium providing the program with a computer readable format, for example, a storage medium such as an optical disc, a magnetic disc, or a semiconductor memory or a communication medium such as a network. The program is provided with the computer readable format, so that a process according to the program is realized on a computer/system.

Effects of the Invention

According to the present technology, proximity detection of a manipulation object is performed on the basis of a sensor signal generated according to proximity and contact of the manipulation object. When a plurality of manipulation objects are detected by the proximity detection, a priority order is set to the detected manipulation objects and a proximity detection result is adopted on the basis of the set priority order. For this reason, even though the plurality of manipulation objects are detected, the proximity detection result having the high priority order is adopted, so that erroneous detection can be prevented and an input manipulation can be correctly performed.

BRIEF DESCRIPTION OF DRAWINGS

FIG. 1 is a schematic cross-sectional view of an information processing apparatus.

FIG. 6 is a diagram illustrating an example of display of a manipulatable region.

FIG. 12 is a diagram illustrating the case in which a multi-proximity detection mode is selected.

FIG. 13 is a diagram illustrating sensitivity adjustment using a register.

MODE FOR CARRYING OUT THE INVENTION

Figure 2:
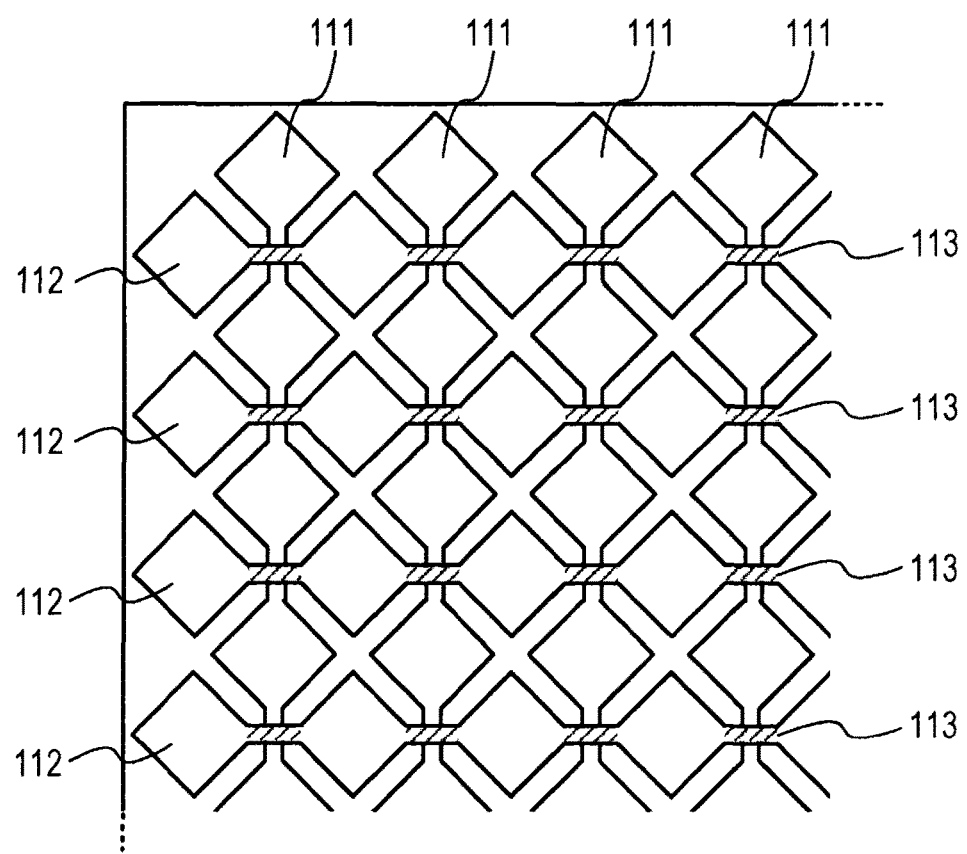
FIG. 2 is a diagram illustrating a configuration of a touch panel.

Hereinafter, modes to carry out the technology will be described. The following description will be made in the order described below.
1. Configuration of information processing apparatus
2. Operation of information processing apparatus
2-1. First operation
2-2. Second operation
2-3. Third operation 1. Configuration of Information Processing Apparatus An information processing apparatus using the technology has a configuration in which a display unit 21 is provided in a casing 50 of the information processing apparatus and a sensor unit 11 is provided on a side of a display surface of the display unit 21, as illustrated in FIG. 1.

As the sensor unit 11, a capacitive touch panel is used. FIG. 2 illustrates a configuration of a touch panel.

In the touch panel, a light transmitting substrate is used. In an active region where a manipulation input is received, a plurality of rows of first light transmitting electrode patterns 111 that extend in a first direction and a plurality of rows of second light transmitting electrode patterns 112 that extend in a second direction crossing the first direction are formed.

In the touch panel, in the case in which a voltage is sequentially applied to the plurality of first light transmitting electrode patterns 111 and the plurality of second light transmitting electrode patterns 112, if a manipulation object such as a finger or a touch pen is positioned in the vicinity and the manipulation object approaches or contacts the touch panel, the capacitance is generated between the first light transmitting electrode patterns 111 and the second light transmitting electrode patterns 112 and the manipulation object. Therefore, it can be detected from the change of the capacitance that the manipulation object is positioned in the vicinity or the manipulation object approaches or contacts any place.

The first light transmitting electrode patterns 111 and the second light transmitting electrode patterns 112 are formed by the same layer on the same surface of the light transmitting substrate. In addition, because the first light transmitting electrode patterns 111 and the second light transmitting electrode patterns 112 are formed by the same layer on the same surface of the light transmitting substrate, a plurality of crossing portions of the first light transmitting electrode patterns 111 and the second light transmitting electrode patterns 112 exist.

Therefore, in any one of the plurality of crossing portions, one electrode pattern of the first light transmitting electrode pattern 111 and the second light transmitting electrode pattern 112 is connected in the crossing portion and the other electrode pattern is disconnected. In this embodiment, in any one of the plurality of crossing portions, the first light transmitting electrode pattern 111 is connected and the second light transmitting electrode pattern 112 is disconnected.

A light transmitting interlayer insulating film is formed on the side of an upper layer of the first light transmitting electrode patterns 111 in the crossing portions. Light transmitting relay electrodes 113 (oblique portions) that electrically connect the second light transmitting electrode patterns 112 disconnected in the crossing portions are formed on an upper layer of the interlayer insulating film. For this reason, the second light transmitting electrode patterns are electrically connected in the second direction.

Here, each of the first light transmitting electrode patterns 111 and the second light transmitting electrode patterns 112 includes a pad portion of a large area of a rhombic shape that is provided in a region interposed by the crossing portions. A connecting portion that is positioned in the crossing portions in the first light transmitting electrode patterns 111 is formed in a small-width shape with a width smaller than a width of the pad portion. In addition, the relay electrode 113 is also formed in a small-width shape with a width smaller than the width of the pad portion and a strip shape. The sensor unit 11 that is configured as described above generates a sensor signal showing the change of the capacitance generated by the proximity or the contact of the manipulation object and outputs the sensor signal to the proximity detecting unit 12.

The display unit 21 is configured using a planar display element such as a liquid crystal display element. The display unit 21 displays a menu screen to perform setting or operation switching of the information processing apparatus.

In the information processing apparatus, a backlight may be provided between the display unit 21 and the casing 50 and the back light may emit light from the side of a back surface of the display unit 21, that is, the side of a surface facing the casing 50 to the display unit 21, thereby facilitating viewing display of the display unit 21.

Figure 3:
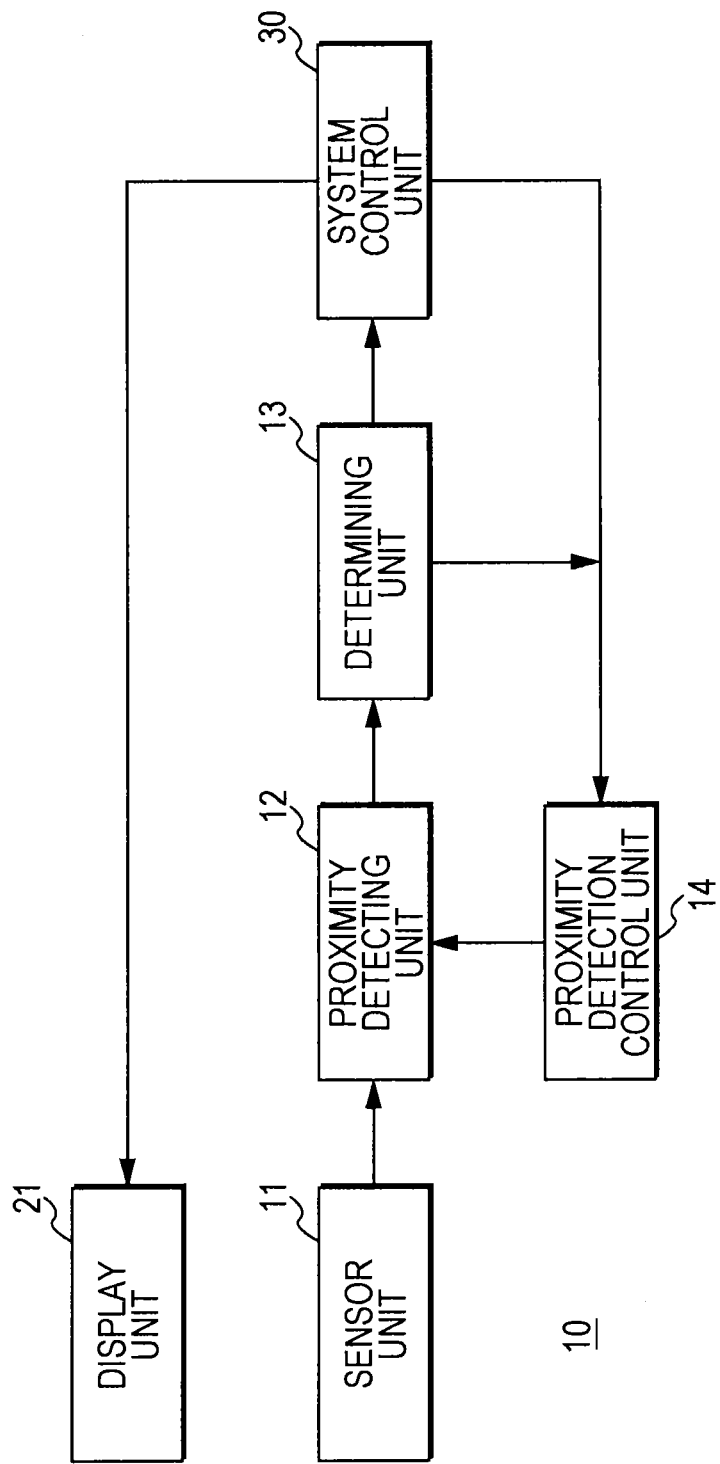
FIG. 3 is a functional block diagram of an information processing apparatus.

FIG. 3 illustrates a functional block diagram of the information processing apparatus. An information processing apparatus 10 has a sensor unit 11, a proximity detecting unit 12, a determining unit 13, a proximity detection control unit 14, a display unit 21, and a system control unit 30.

The sensor unit 11 generates the sensor signal showing the change of the capacitance generated by the proximity or the contact of the manipulation object and outputs the sensor signal to the proximity detecting unit 12, as described above.

The proximity detecting unit 12 performs proximity detection of the manipulation object, on the basis of the sensor signal from the sensor unit 11. The proximity detecting unit 12 performs the proximity detection and outputs a detection result to the determining unit 13. In the proximity detection, a detection result showing a vicinity detection state or a detection result showing a proximity detection state is generated. The vicinity detection state means a state in which a position of the manipulation object cannot be detected, but the manipulation object exists in the vicinity of the sensor unit 11. In addition, the proximity detection state means a state in which a position of the manipulation object approaching or contacting the sensor unit 11 is detected.

The determining unit 13 determines validity of the proximity detection result, according to whether a detection position detected by the proximity detection is in a manipulatable region provided in a region where detection of the contact of the manipulation object is enabled. The determining unit 13 outputs a valid proximity detection result or the proximity detection result and a determination result of the validity to the system control unit 30. In addition, when a plurality of manipulation objects are detected by the proximity detection, the determining unit 13 sets a priority order to the detected manipulation objects, adopts the proximity detection result on the basis of the set priority order, and outputs the proximity detection result to the system control unit 30.

The proximity detection control unit 14 controls detection sensitivity of the proximity detection in the proximity detecting unit 12, on the basis of a control signal supplied from the system control unit 30 or the determination result of the determining unit 13.

The system control unit 30 generates a display signal and outputs the display signal to the display unit 21. In addition, the system control unit 30 executes an individual process or an integration process of the proximity detection result, on the basis of the proximity detection result supplied from the determining unit 13. Furthermore, the system control unit 30 determines a manipulation performed by the user from the proximity detection result supplied from the determining unit 13 and the display performed by the display unit 21 and performs control such that an operation of the information processing apparatus 10 becomes an operation according to a user manipulation, on the basis of a determination result.

2. Operation of Information Processing Apparatus

The information processing apparatus 10 determines the validity of the proximity detection result, according to whether the detection position of the manipulation object detected by the proximity detection is in the manipulatable region provided in the region where the detection of the contact of the manipulation object is enabled, and prevents the input manipulation from being erroneously detected. In addition, when the plurality of manipulation objects are detected in the proximity detection, the information processing apparatus 10 sets the priority order to the detected manipulation objects and adopts the proximity detection result on the basis of the set priority order, thereby preventing the input manipulation from being erroneously detected. Furthermore, the information processing apparatus 10 controls the detection sensitivity in the proximity detection of the manipulation object and prevents the erroneous detection. Hereinafter, in a first operation, an operation of the case in which the validity of the proximity detection result is determined will be described. In a second operation, an operation of the case in which the plurality of manipulation objects are detected will be described. In a third operation, an operation of the case in which the detection sensitivity of the proximity detection is controlled will be described.

2-1. First Operation

Figure 4:
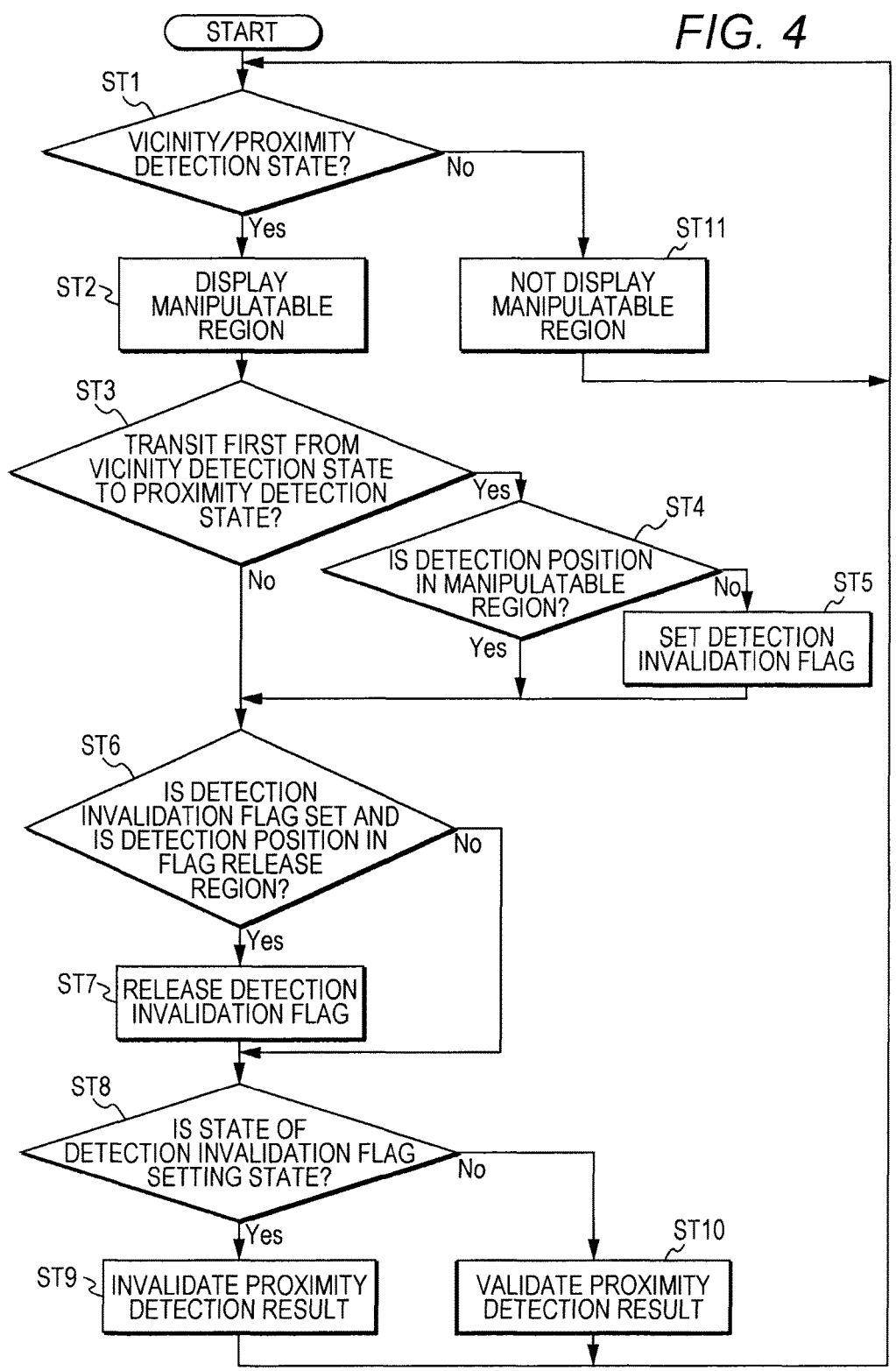
FIG. 4 is a flowchart illustrating a first operation.

FIG. 4 is a flowchart illustrating the first operation of the information processing apparatus 10. In step ST1, the information processing apparatus 10 determines whether the state of the manipulation object is the vicinity/proximity detection state. When the manipulation object comes close to the sensor unit 11 and the state thereof becomes the vicinity detection state or when the manipulation object approaches or contacts the sensor unit 11 and the state thereof becomes the proximity detection state, the information processing apparatus 10 proceeds to step ST2. In addition, the information processing apparatus 10 proceeds to step ST11, in the other cases.

Figure 5:
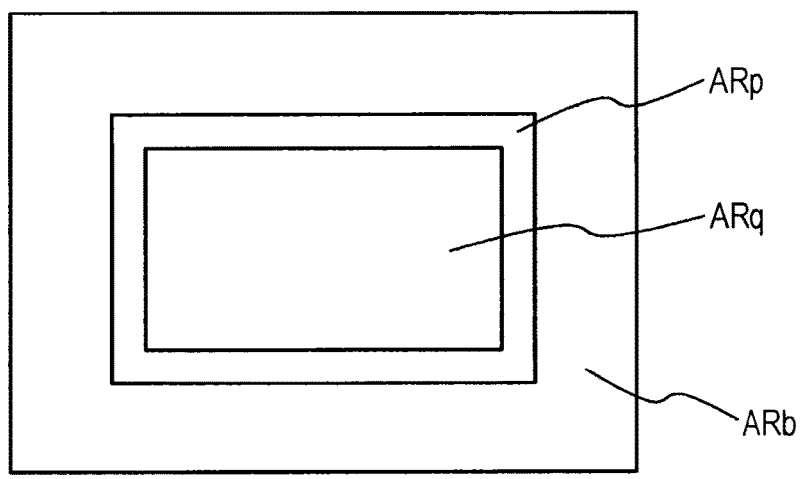
FIG. 5 is a diagram illustrating a manipulatable region and a detection invalidity flag release region.

In step ST2, the information processing apparatus 10 displays the manipulatable region. Because the manipulation object comes close to the touch panel, the information processing apparatus 10 displays the manipulatable region by the display unit 21 and proceeds to step ST3. A manipulatable region ARp is a region provided in an active region ARb to be a region where the detection of the contact of the manipulation object is enabled, as illustrated in FIG. 5, and is associated with the display of the display unit 21.

In step ST3, the information processing apparatus 10 determines whether the state of the manipulation object has transited first from the vicinity detection state to the proximity detection state. When the state of the manipulation object has become the proximity or contact state first from the vicinity state of the sensor unit 11, the information processing apparatus 10 proceeds to step ST4 and proceeds to step ST6 in the other cases.

In step ST4, the information processing apparatus 10 proceeds to step ST6 when the detection position is in the manipulatable region and proceeds to step ST5 in the other cases.

In step ST5, the information processing apparatus 10 sets a detection invalidity flag and proceeds to step ST6.

In step ST6, the information processing apparatus 10 determines whether the detection invalidity flag is set and the detection position is in a detection invalidity flag release region. A detection invalidity flag release region ARq is a region provided in the manipulatable region ARp, as illustrated in FIG. 5. When the detection invalidity flag is set and the detection position is in the detection invalidity flag release region, the information processing apparatus 10 proceeds to step ST7. In addition, the information processing apparatus 10 proceeds to step ST8 in the other cases.

In step ST7, the information processing apparatus 10 releases the detection invalidity flag. The information processing apparatus 10 releases the set detection invalidity flag and proceeds to step ST8.

In step ST8, the information processing apparatus 10 determines whether a state of the detection invalidity flag is a setting state. When the detection invalidity flag is set, the information processing apparatus 10 proceeds to step ST9 and when the detection invalidity flag is released, the information processing apparatus 10 proceeds to step ST10.

In step ST9, the information processing apparatus 10 invalidates the proximity detection result generated by the proximity detecting unit 12 and returns to step ST1.

In step ST10, the information processing apparatus 10 validates the proximity detection result generated by the proximity detecting unit 12 and returns to step ST1.

If the information processing apparatus 10 proceeds from step ST1 to step ST11, the information processing apparatus 10 sets the manipulatable region as non-display. When the manipulation object does not approach or contact the sensor unit 11 and does not exist in the vicinity position, it cannot be determined that the user manipulation is performed. Therefore, the information processing apparatus 10 sets the manipulatable region as the non-display. In addition, when the manipulatable region is not displayed, the information processing apparatus 10 turns off the backlight and can decrease consumption power.

Furthermore, all of the processes from step ST1 to step ST11 do not need to be executed and a part of the processes may be selectively executed. For example, only the processes from step ST3 to step ST10 may be executed.

FIG. 6 illustrates an example of display of the manipulatable region. When the state of the manipulation object is not the vicinity/proximity detection state, the information processing apparatus 10 sets the manipulatable region as the non-display, like a "button 1" in FIG. 6(A). In addition, the information processing apparatus 10 sets a color of the manipulatable region as a color with low luminosity, like a "button 2". When a display size is varied, the information processing apparatus 10 sets a size of button display as a small size. When the manipulatable region is set as the non-display, for example, the information processing apparatus 10 may turn off the backlight and set the display of the display unit 21 as black display. Alternatively, the information processing apparatus 10 may set the display of the display unit 21 as standby screen display.

In addition, when the manipulation object comes close to the sensor unit 11 and the state thereof becomes the vicinity detection state or the proximity detection state, the information processing apparatus 10 displays the manipulatable region, like a "button 1" in FIG. 6(B). In addition, the information processing apparatus 10 sets a color of the manipulatable region as a color with high luminosity, like a "button 2". When a display size is varied, the information processing apparatus 10 sets a size of button display as a large size, like a "button 3". When the backlight is turned off in the non-display of the manipulatable region, the information processing apparatus 10 turns on the backlight and performs the display by the display unit 21. In the display of the manipulatable region, gradations or animations may be added to button or icon display, so that it may be identified that a state is a display state.

Figure 7:
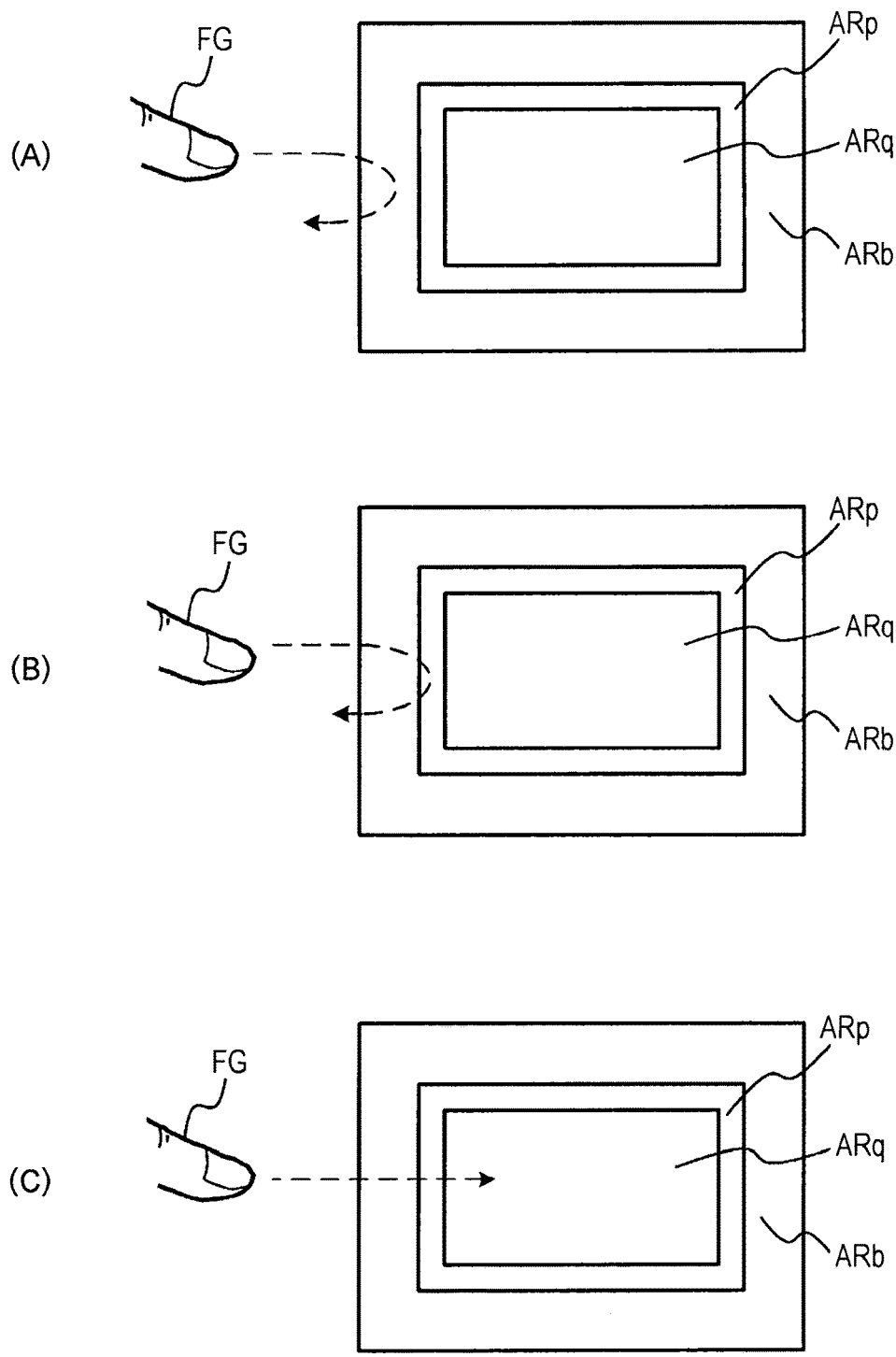
FIG. 7 is a diagram illustrating a relation of movement of a manipulation object and a vicinity detection result.

FIG. 7 illustrates a relation of the movement of the manipulation object and the proximity detection result. As illustrated in FIG. 7(A), after the manipulation object comes close to the sensor unit 11 and the state thereof becomes the vicinity detection state, when the detection position when the state of the manipulation object becomes the proximity detection state first is outside the manipulatable region ARp, the detection invalidity flag is set. In addition, when the detection invalidity flag is set, the proximity detection result is invalidated. As such, because the proximity detection result is invalidated, the erroneous detection is not generated when the manipulation object comes close to the outside of the manipulatable region.

In addition, if the state of the manipulation object proceeds first from the vicinity detection position to the proximity detection position and the detection invalidity flag is set, the proximity detection result is invalidated even though the manipulation object is in the manipulatable region ARp and the state of the manipulation object becomes the proximity detection state at the position outside the detection invalidity flag release region ARq, as illustrated in FIG. 7(B). In addition, as illustrated in FIG. 7(C), if the detection position of the manipulation object becomes the position in the detection invalidity flag release region ARq, the detection invalidity flag is released and the proximity detection result is validated.

As such, a region to set the detection invalidity flag and a region to release the detection invalidity flag become different regions and the detection invalidity flag release region is a region existing in the manipulatable region and narrower than the manipulatable region. Therefore, the validity of the proximity detection result can be stably determined.

Figure 8:
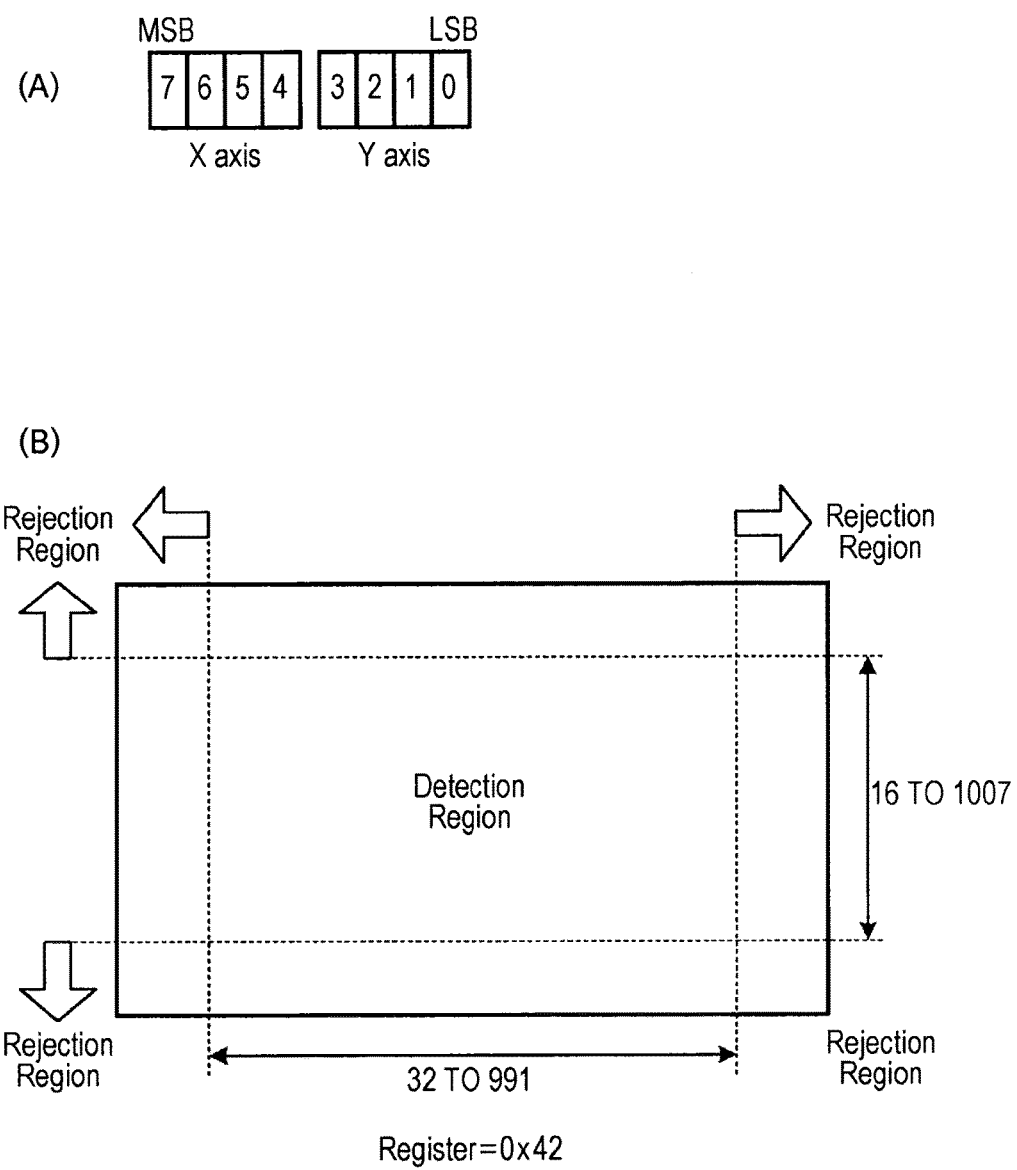
FIG. 8 is a diagram illustrating a method of setting a region.

The setting of the manipulatable region or the detection invalidity flag release region can be easily performed by using a register. For example, as illustrated in FIG. 8(A), an 8-bit register is provided and upper 4 bits of the register are set as a threshold value to set a range of a region in an X-axis direction and lower 4 bits of the register are set as a threshold value to set a range of a region in a Y-axis direction. FIG. 8(B) illustrates the case in which the register is set as "0x42" and the manipulatable region is set. Each of the resolution of the X-axis direction and the resolution of the Y-axis direction in the sensor unit 11 is set as "1023".

Because the upper 4 bits of the register are "4", a region "32 to 991" other than a range of "4×8" from the side of an end in the X-axis direction is set as the manipulatable region. In addition, because the lower 4 bits are "2", a region "16 to 1007" other than a range of "2×8" in the Y-axis direction is set as the manipulatable region. As such, the manipulatable region can be easily set by using the register. Likewise, the detection invalidity flag release region can be easily set by using the register.

As such, according to the first operation, the proximity detection of the manipulation object is performed on the basis of the signal sensor generated according to the proximity and the contact of the manipulation object and the validity of the proximity detection result is determined according to whether the detection position detected by the proximity detection is in the manipulatable region provided in the region where the detection of the contact of the manipulation object is enabled. For this reason, the error detection can be prevented and the input manipulation can be correctly performed.

In addition, because the detection position is the position outside the manipulatable region, the detection invalidity flag is set. When the detection position moves and becomes the position of the detection invalidity flag release region in the manipulatable region, the detection invalidity flag is released and the proximity detection result is validated. Therefore, a more reliable proximity detection result can be used as compared with the information processing apparatus according to the related art that uses the proximity detection result when the state of the manipulation object becomes the proximity detection state.

In addition, the detection invalidity flag release region may be offset from the center of the manipulatable region and may be set. For example, the detection invalidity flag release region of FIG. 7 is offset in a rightward direction and is set, such that the detection invalidity flag release region is apart from a portion which the finger is easy to contact, when the user grips the information processing apparatus. As such, if the detection invalidity flag release region is set, generation of the case in which the detection invalidity flag is erroneously released decreases and the erroneous detection can be prevented more surely.

In addition, when the manipulation object is detected by the proximity detecting unit, the manipulatable region is displayed identifiably by the display unit. For this reason, because the position of the manipulatable region can be easily confirmed by the user, the erroneous manipulation can be prevented by referring to the display.

2-2. Second Operation

Figure 9:
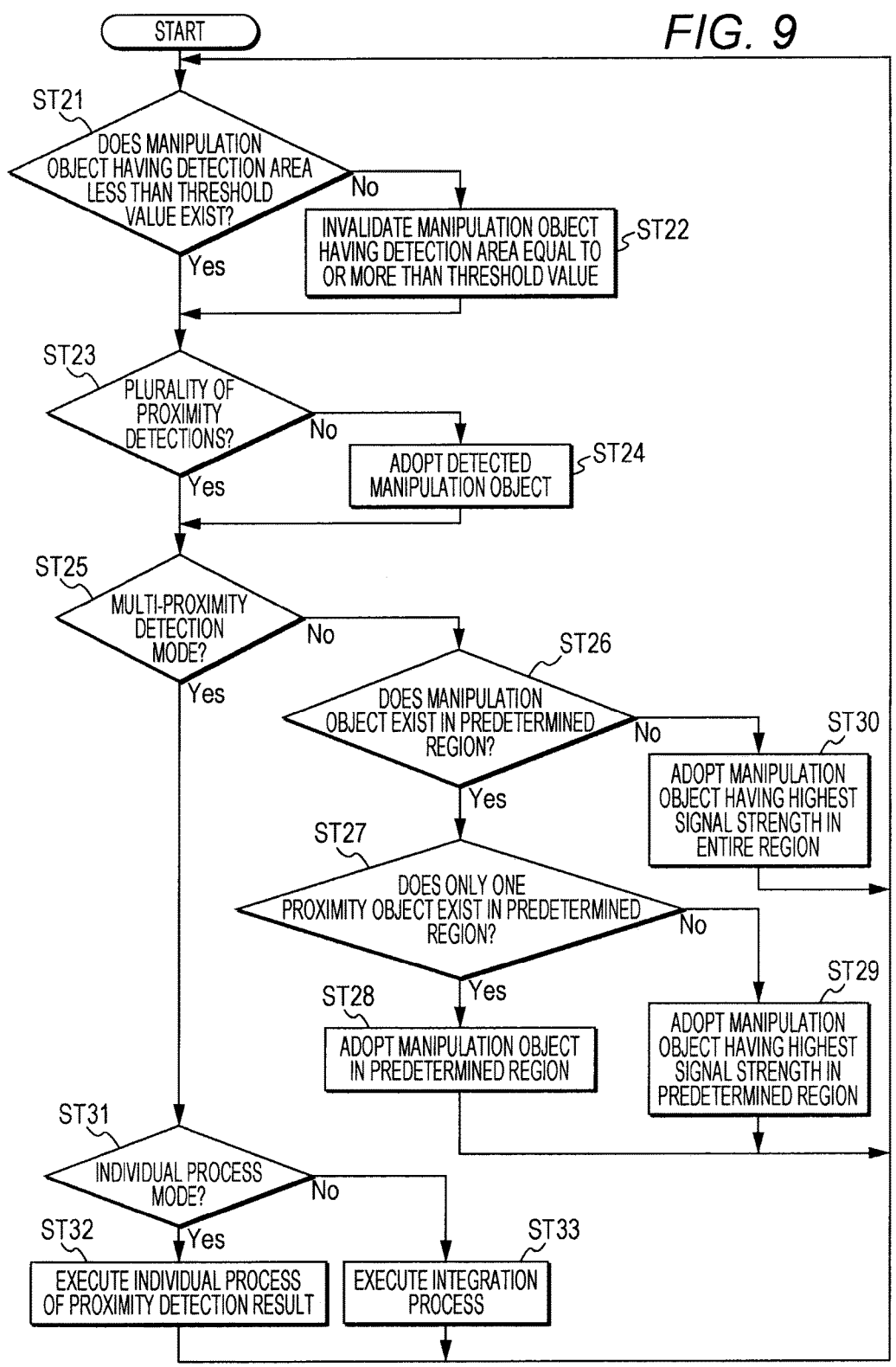
FIG. 9 is a flowchart illustrating a second operation.

FIG. 9 is a flowchart illustrating the second operation of the information processing apparatus 10. In step ST21, the information processing apparatus 10 determines whether a manipulation object having a detection area less than a threshold value exists. When the manipulation object having the detection area less than the threshold value does not exist, the information processing apparatus 10 proceeds to step ST22 and when the manipulation object having the detection area less than the threshold value exists, the information processing apparatus 10 proceeds to step ST23.

In step ST22, the information processing apparatus 10 invalidates a manipulation object having a detection area equal to or more than the threshold value. The information processing apparatus 10 invalidates the manipulation object having the detection area equal to or more than the threshold value, for example, a manipulation object such as a back of a hand or a palm of the hand having a detection area more than a detection area of the finger when the manipulation is performed by the finger and proceeds to step ST23.

In step ST23, the information processing apparatus 10 determines whether the detection is a plurality of proximity detections. When the number of proximally detected manipulation objects is plural, the information processing apparatus 10 proceeds to step ST25 and when the number of proximally detected manipulation objects is one, the information processing apparatus 10 proceeds to step ST24.

In step ST24, the information processing apparatus 10 adopts the detected manipulation object. Because the number of manipulation objects having the detection area less than the threshold value is one, the information processing apparatus 10 adopts the detected manipulation object and proceeds to step ST25.

In step ST25, the information processing apparatus 10 determines whether a multi-proximity detection mode is selected. When the multi-proximity detection mode using a plurality of proximity detection results is selected, the information processing apparatus 10 proceeds to step ST31. In addition, when the multi-proximity detection mode is not selected, the information processing apparatus 10 proceeds to step ST26.

In step ST26, the information processing apparatus 10 determines whether a manipulation object exists in a predetermined region. When the manipulation object exists in a region of a constant range from the center of a screen of the display unit 21 in the predetermined region, for example, the region where the detection of the contact of the manipulation object is enabled, the information processing apparatus 10 proceeds to step ST27. In addition, when the manipulation object does not exist in the predetermined region, the information processing apparatus 10 proceeds to step ST30.

In step ST27, the information processing apparatus 10 determines whether only one manipulation object exists in the predetermined region. When one manipulation object exists in the predetermined region, the information processing apparatus 10 proceeds to step ST28. When the plurality of manipulation objects exist in the predetermined region, the information processing apparatus 10 proceeds to step ST29.

In step ST28, the information processing apparatus 10 adopts the manipulation object in the predetermined region. The information processing apparatus 10 outputs a proximity detection result of the manipulation object in the predetermined region from the determining unit 13 to the system control unit 30 and returns to step ST21.

In step ST29, the information processing apparatus 10 adopts the manipulation object having the highest signal strength in the predetermined region. Because the plurality of manipulation objects exist in the predetermined region, the information processing apparatus 10 outputs a proximity detection result of the manipulation object having the highest signal strength from the determining unit 13 to the system control unit 30 and returns to step ST21.

If the information processing apparatus 10 proceeds from step ST26 to step ST30, the information processing apparatus 10 adopts the manipulation object having the highest signal strength in the entire region. The information processing apparatus 10 outputs a proximity detection result of the manipulation object having the highest signal strength in the entire region from the determining unit 13 to the system control unit 30 and returns to step ST21.

In step ST31, the information processing apparatus 10 determines whether a mode is an individual process mode. When the individual mode in which the process is executed using the plurality of proximity detection results separately is selected, the information processing apparatus 10 proceeds to step ST32. In addition, when the individual mode is not selected, the information processing apparatus 10 proceeds to step ST33.

In step ST32, the information processing apparatus 10 executes the individual process of the proximity detection results. The information processing apparatus 10 executes the process using all of the proximity detection results individually and returns to step ST21. For example, when identification display corresponding to the manipulation object is performed by the display unit 21 as the individual process, the identification display is arranged at the detection position of the manipulation object detected by the proximity detection. In addition, a display size of the identification display is set according to the signal strength when the manipulation object is detected.

In step ST33, the information processing apparatus 10 executes an integration process. The information processing apparatus 10 executes the process using all of the proximity detection results and returns to step ST21. For example, when the identification display corresponding to the manipulation object is performed by the display unit 21 as the integration process, a region surrounded by the detection position of the manipulation object detected by the proximity detection is set as a region of the identification display.

Furthermore, all of the processes from step ST21 to step ST33 do not need to be executed and a part of the processes may be selectively executed. For example, only the processes from step ST26 to step ST30 may be executed or only the processes of step ST26 to step ST33 may be executed.

Figure 10:
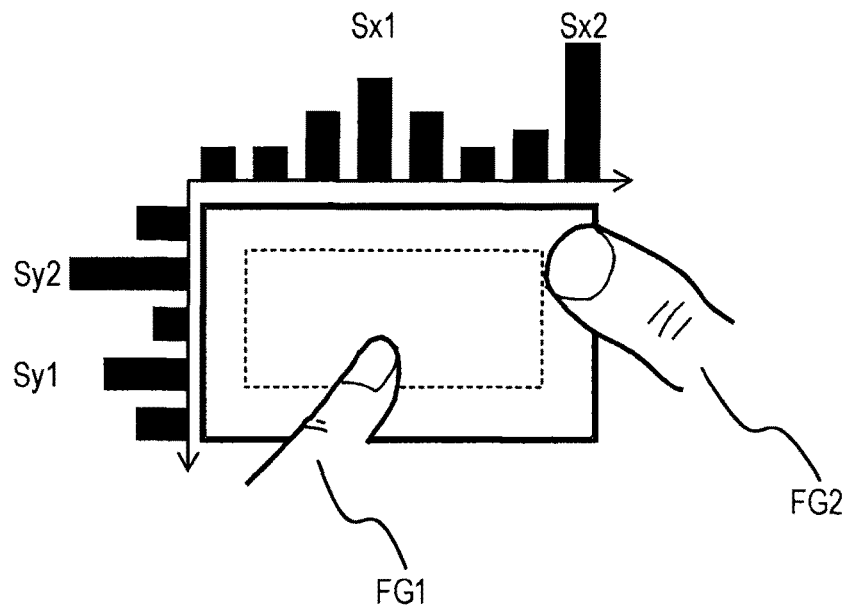
FIG. 10 is a diagram illustrating an example of signal strength when a plurality of manipulation objects are detected.

FIG. 10 illustrates an example of the signal strength when a plurality of manipulation objects are detected. In FIG. 10, two fingers FG1 and FG2 are set as manipulation objects and the signal strength of the X-axis direction in the finger FG1 is set as "Sx1" and the signal strength of the X-axis direction in the finger FG2 is set as "Sx2". In addition, the signal strength of the Y-axis direction in the finger FG1 is set as "Sy1" and the signal strength of the Y-axis direction in the finger FG2 is set as "Sy2".

Here, if the fingers FG1 and FG2 are detected and the finger FG1 is in a predetermined region shown by a broken line, the finger FG1 is adopted as the manipulation object, because the number of manipulation objects in the predetermined region is one.

Figure 11:
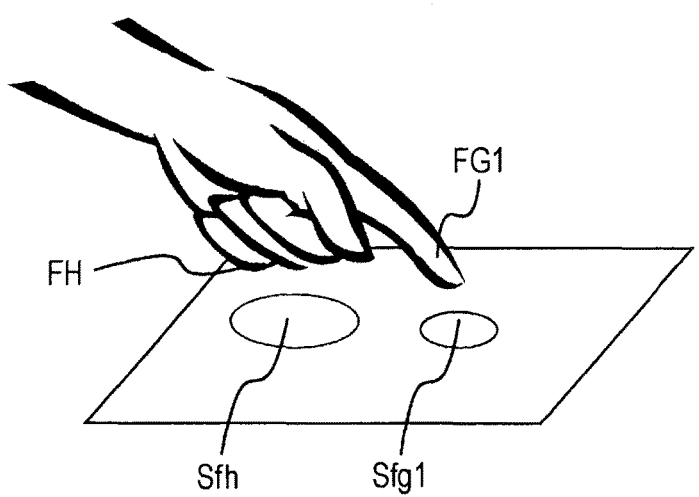
FIG. 11 is a diagram illustrating a state in which a grip portion of a hand approaches a sensor unit when a finger is used as a manipulation object.

FIG. 11 illustrates the case in which a grip portion FH of the hand approaches the sensor unit, when the finger FG1 is used as the manipulation object. The grip portion FH of the hand has a large size, as compared with the finger FG1. Therefore, if the finger FG1 comes close to the sensor unit, the grip portion FH also comes close to the sensor unit. Here, if the threshold value of the detection area is set to be smaller than a detection area Sfh of the grip portion FH and more than a detection area Sfg1 of the finger FG1, even when the grip portion FH is detected as the manipulation object, the detection is invalidated. Therefore, only the finger FG1 can be detected as the manipulation object and the grip portion FH can be prevented from being erroneously detected.

FIG. 12 illustrates the case in which the multi-proximity detection mode is selected. FIG. 12(A) illustrates the case in which the multi-proximity detection mode is selected and the individual process mode is selected. In FIG. 12(A), the two fingers FG1 and FG2 are set as the manipulation objects. When the finger FG1 approaches the sensor unit 11 more than the finger FG2 and the signal strength of the finger FG1 is more than the signal strength of the finger FG2, a display size of identification display PA1 corresponding to the finger FG1 becomes more than a display size of identification display PA2 corresponding to the finger FG2. In this way, the proximity detection result of the manipulation object can be easily confirmed by the display of the display unit 21.

FIG. 12(B) illustrates the case in which the multi-proximity detection mode is selected and the individual process mode is not selected. In FIG. 12(B), three fingers FG1, FG2, and FG3 are set as manipulation objects. When the fingers FG1 to FG3 approach the sensor unit 11 and are detected, a region surrounded by positions of the fingers FG1 to FG3 detected by the proximity detection is displayed as identification display PA3. In this way, when the range is set by the plurality of manipulation objects, the range set on the basis of the plurality of proximity detection results can be displayed and a setting state of the region can be easily confirmed.

As such, in the second operation, when the plurality of manipulation objects are detected by the proximity detection, the priority order is set to the detected manipulation objects. For example, the priority order of the manipulation objects positioned in the predetermined region provided in the region where the detection of the contact of the manipulation objects is enabled or the manipulation objects where the signal strengths of the sensor signals are high in the manipulation objects positioned in the predetermined region is set high and the proximity detection result is adopted on the basis of the set priority order. For this reason, even though the plurality of manipulation objects are detected, the erroneous detection can be prevented by adopting the proximity detection result having the high priority order.

In addition, when the detection size of the manipulation object detected by the proximity detection is more than the threshold value, the corresponding manipulation object is determined as the invalidity. For this reason, when the finger comes close to the manipulatable region, even if the grip portion of the hand comes close to the sensor unit, the grip portion can be prevented from being erroneously detected as the manipulation object.

Furthermore, when the plurality of manipulation objects are detected, the process using the plurality of proximity detection results individually or the process using the plurality of proximity detection results collectively can be executed. For this reason, identification display for every multiple manipulation objects can be performed or display of a region surrounded by the plurality of manipulation objects as the identification display is enabled and various processes can be executed. In the second operation, the case in which the identification display in the display unit 21 is switched according to whether the individual process mode is selected has been described. However, various process operations may be switched on the basis of not only the identification display but also the proximity detection result.

In addition, when the manipulation object having the high signal strength is adopted, a hysteresis characteristic is given and the manipulation object is adopted, such that the adopted manipulation object is prevented from being switched frequently due to the change in the signal strength. If this process is executed, a stable operation is enabled.

2-3. Third Operation

In the first operation and the second operation, the erroneous detection of the manipulation object is prevented on the basis of the position or the detection area of the manipulation object. In the third operation, the case in which the detection sensitivity of the proximity detection is controlled and the erroneous detection is prevented will be described.

The proximity detection control unit 14 controls the detection sensitivity of the proximity detection performed by the proximity detecting unit 12 and prevents the erroneous detection. The control of the detection sensitivity can be easily performed by using a register. For example, as illustrated in FIG. 13(A), an 8-bit register for sensitivity adjustment is provided, setting on whether or not to perform the sensitivity adjustment is performed by upper 4 bits of the register, and a type of the sensitivity adjustment is set by lower 4 bits.

A most significant bit of the register is set as a bit to set whether or not to perform the sensitivity adjustments of sensors X0 and Xm of the sides of left and right ends illustrated in FIG. 13(B). In addition, a second bit is set as a bit to set whether or not to perform the sensitivity adjustments of left and right sensors X1 and Xm−1 positioned at the inner sides of the sensors X0 and Xm in which it is set by the most significant bit whether or not to perform the sensitivity adjustments. In addition, a third bit is set as a bit to set whether or not to perform the sensitivity adjustments of sensors Y0 and Yn of the sides of upper and lower ends. In addition, a four bit is set as a bit to set whether or not to perform the sensitivity adjustments of upper and lower sensors Y1 and Yn−1 positioned at the inner sides of the sensors Y0 and Yn in which it is set by the third bit whether or not to perform the sensitivity adjustments.

In a fifth bit included in the lower 4 bits of the register, the sensitivity adjustments of the sensors X0 and Xm are performed. In a sixth bit, the sensitivity adjustments of the sensors X1 and Xm−1 are performed. In a seventh bit, the sensitivity adjustments of the sensors Y0 and Yn are performed. In a least significant bit, the sensitivity adjustments of the sensors Y1 and Yn−1 are performed. In the sensitivity adjustment, the sensitivity adjustment of the proximity detection can be performed by adjusting gain of a sensor signal or a level of a threshold value, when the detection of the manipulation object is performed by comparing the sensor signal and the threshold value.

FIG. 13(B) illustrates the case in which a sensitivity adjustment register is set as "0×E4". In upper 4 bits of the sensitivity adjustment register, the sensitivity adjustment is performed when bits are set as "1" and the sensitivity adjustment is not performed when bits are set as "0". In addition, in the lower 4 bits, when bits are set as "1", the sensitivity is decreased to "50%" and when bits are set as "0", the sensitivity is decreased to "0%", that is, the proximity detection is not performed.

When the sensitivity adjustment register is set as "0×E4 (=11100100)", the sensitivity adjustments are performed in the sensors X0, X1, Xm−1, Xm, Y0, and Yn, because bits from a most significant bit to a third bit are "1". In addition, because a fourth bit is "0", the sensitivity adjustments are not performed in the sensors Y1 and Yn−1. In addition, because fifth and seventh bits are "0", the sensitivities of the sensors X0, Xm, Y0, and Yn are set to "0%". In addition, because a sixth bit is "1", the sensitivities of the sensors X1 and Xm−1 are set to "50%". Therefore, the sensitivity adjustment is performed as illustrated in FIG. 13(B).

As such, if the detection sensitivity is set variably for each area and the sensitivity of a portion easily contacting a user when the user holds a casing is decreased, the erroneous detection can be decreased. In addition, the sensitivity adjustment is not limited to the case in which the sensitivity adjustment is performed using the register. For example, when a sensor signal of each sensor is read from the sensor unit 11, a table showing a relation of a read position and sensitivity may be prepared and the sensitivity adjustment may be performed on the basis of the table.

If the sensitivity of a region where an icon or the like is not displayed by the display unit 21 is set as "0" so that reading of the sensor signal is not performed, consumption power can be decreased. Furthermore, directivity of the detection sensitivity can be maintained according to the obtained proximity detection result. For example, if the detection sensitivity is increased with respect to a movement direction of the finger to be the manipulation object, detection precision of the manipulation object can be raised.

In addition, in the sensitivity adjustment, a ground layer may be provided on a surface of the sensor unit 11. For example, the ground layer may be provided in a peripheral portion of the sensor unit 11 to suppress the capacitance from being changed by a hand holding the casing. As the ground layer, a grounded metal plate or thin conductive film is used.

In addition, the series of processes described in the specification can be executed by hardware, software, or a complex configuration of the hardware and the software. When the processes are executed by the software, a program having a process sequence recorded is installed in a memory in a computer embedded in exclusive hardware and the program is executed. In addition, the program is installed in a general-purpose computer that can execute various processes and the program is executed.

The program can be previously recorded on a hard disk and ROM (Read Only Memory) functioning as recording media. Alternatively, the program may be temporarily or permanently stored (recorded) in removable recording media such as a flexible disc, a CD-ROM (Compact Disc Read Only Memory), an MO (Magneto optical) disc, a DVD (Digital Versatile Disc), a magnetic disc, and semiconductor memory. The removable recording media can be provided as so-called package software.

The program is installed from the removable recording media described above to the computer. In addition, the program is transmitted from a download site to the computer by wireless or is transmitted to the computer by wire, through a network such as a LAN (Local Area Network) or the Internet. The computer receives the program transmitted as described above and installs the program in recording media such as an embedded hard disk.

In addition, it should be noted that the present technology is not analyzed to be limited to the embodiments described above. For example, the first to third operations may be performed individually or the first to third operations may be combined and may be performed integrally. The embodiments disclose the present technology in an exemplary form and it is apparent that those skilled in the art may find modifications and alternations of the embodiments without departing from the scope of the technology. That is, claims need to be considered to determine the scope of the present technology.

In addition, the present technology may take the following configurations.

(1) An information processing apparatus including:
　a sensor unit that generates a sensor signal according to proximity and contact of a manipulation object;
　a proximity detecting unit that performs proximity detection of the manipulation object, on the basis of the sensor signal; and
　a determining unit that, when a plurality of manipulation objects are detected by the proximity detection, sets the priority order to the detected manipulation objects and adopts a proximity detection result on the basis of the set priority order.

(2) The information processing apparatus according to (1), wherein the determining unit sets the high priority order to a manipulation object positioned in a predetermined region provided in a region where detection of the contact of the manipulation object is enabled.

(3) The information processing apparatus according to (2), wherein the determining unit sets the high priority order to a manipulation object in which the signal strength of the sensor signal is high, when a plurality of manipulation objects are positioned in the predetermined region.

(4) The information processing apparatus according to any one of (1) to (3), wherein, when a detection size of the manipulation object detected by the proximity detection is more than a threshold value, the determining unit determines the manipulation object as invalidity.

(5) The information processing apparatus according to any one of (1) to (4), further including: a control unit that executes an individual process or an integration process of proximity detection results, when a plurality of manipulation objects are detected by the proximity detection.

(6) The information processing apparatus according to (5), further including: a display unit that performs image display, wherein the control unit performs region display corresponding to each manipulation object by the display unit, on the basis of the proximity detection results of the plurality of detected manipulation objects, and sets a display size of the region display according to the signal strength of the sensor signal, as the individual process of the proximity detection results.

(7) The information processing apparatus according to (5), further including: a display unit that performs image display, wherein the control unit displays a region surrounded by positions shown by the plurality of proximity detection results by the display unit, on the basis of the proximity detection results of the plurality of detected manipulation objects, as the integration process of the proximity detection results.

(8) The information processing apparatus according to any one of (1) to (7), wherein the determining unit determines validity of the proximity detection result, according to whether a detection position detected by the proximity detection is in a manipulatable region provided in a region where detection of the contact of the manipulation object is enabled.

(9) The information processing apparatus according to (8), wherein the determining unit validates the proximity detection result, when the detection position is in the manipulatable region, and invalidates the proximity detection result, when the detection position is outside the manipulatable region.

(10) The information processing apparatus according to (9), wherein the determining unit sets a detection invalidation flag and invalidates the proximity detection result, when the detection position is outside the manipulatable region, and releases the detection invalidation flag and validates the proximity detection result, when the detection position moves and becomes a position of a detection invalidation flag release region in the manipulatable region.

(11) The information processing apparatus according to any one of (8) to (10), further including: a display unit that performs image display, wherein, when the manipulation object is detected by the proximity detecting unit, the manipulatable region is displayed identifiably by the display unit.

(12) The information processing apparatus according to any one of (1) to (11), including: a proximity detection control unit that controls detection sensitivity of the proximity detection in the proximity detecting unit.

(13) The information processing apparatus according to any one of (1) to (12), wherein the proximity detection control unit decreases detection sensitivity of the side of an end of the region where the detection of the contact of the manipulation object is enabled, such that the detection sensitivity becomes lower than the detection sensitivity of the other portion.

(14) The information processing apparatus according to any one of (1) to (13), wherein the sensor unit is a capacitive touch panel.

INDUSTRIAL APPLICABILITY

In an information processing apparatus, an information processing method, and a program according to the present technology, proximity detection of a manipulation object is performed on the basis of a sensor signal generated according to proximity and contact of the manipulation object. When a plurality of manipulation objects are detected by the proximity detection, a priority order is set to the detected manipulation objects and a proximity detection result is adopted on the basis of the set priority order. For this reason, even though the plurality of manipulation objects are detected, the proximity detection result having the high priority order is adopted, so that erroneous detection can be prevented and an input manipulation can be correctly performed. Therefore, the present technology is suitable for an apparatus that performs an input manipulation using a touch panel.

REFERENCE SIGNS LIST

10 Information processing apparatus
11 Sensor unit
12 Proximity detecting unit
13 Determining unit
14 Proximity detection control unit
21 Display unit
30 System control unit
50 Casing
111 First light transmitting electrode pattern
112 Second light transmitting electrode pattern
113 Relay electrode

The invention claimed is:
1. An information processing apparatus, comprising:
a touch sensor configured to generate a sensor signal based on proximity and contact of a manipulation object on a display screen,
wherein the display screen comprises a manipulatable region and a detection invalidity region that lies within the manipulatable region; and circuitry configured to:
: detect proximity of the manipulation object based on the sensor signal,
: wherein a first proximity detection of the manipulation object in the manipulatable region outside the detection invalidity region is invalid based on a second proximity detection of the manipulation object outside the detection invalidity region prior to the first proximity detection in the manipulatable region outside the detection invalidity region, and
: wherein the first proximity detection of the manipulation object in the manipulatable region outside the detection invalidity region is valid based on a third proximity detection of the manipulation object in the detection invalidity region prior to the first proximity detection in the manipulatable region outside the detection invalidity region;
: set a priority order among a plurality of manipulation objects based on the proximity detection of the plurality of manipulation objects;
: adopt a proximity detection result based on the set priority order; and
: set a display size of a first region corresponding to each manipulation object of the plurality of manipulation objects based on a signal strength of the sensor signal corresponding to the each manipulation object of the plurality of manipulation objects.

2. The information processing apparatus according to claim 1, wherein the circuitry is further configured to set the priority order of each manipulation object based on the signal strength and a position of each manipulation object of the plurality of manipulation objects in the manipulatable region.

3. The information processing apparatus according to claim 1, wherein the circuitry is further configured to determine the proximity detection of the manipulation object as invalid based on a detection size of the manipulation object that is more than a threshold value.

4. The information processing apparatus according to claim 1, wherein the circuitry is further configured to determine one of an individual process or an integration process of proximity detection results, based on the plurality of manipulation objects that are detected by the proximity detection.

5. The information processing apparatus according to claim 1,
: wherein the circuitry is further configured to:
: control the display screen, and
: wherein the display screen is configured to:
: display an image; and
: display the first region corresponding to each manipulation object of the plurality of manipulation objects based on respective proximity detection result of the plurality of manipulation objects.

6. The information processing apparatus according to claim 1,
: wherein the circuitry is configured to control the display screen based on proximity detection results of the plurality of manipulation objects, and
: wherein the display screen is configured to:
: display an image; and
: display a second region that surrounds positions of the proximity detection results of the plurality of manipulation objects, wherein the second region corresponds to an integration process of the proximity detection results.

7. The information processing apparatus according to claim 1, wherein detection of the contact of the manipulation object is enabled in the manipulatable region.

8. The information processing apparatus according to claim 1, wherein the circuitry is configured to invalidate the third proximity detection of the manipulation object outside the manipulatable region.

9. The information processing apparatus according to claim 1, wherein the circuitry is further configured to:
: set a detection invalidation flag and determine the third proximity detection of the manipulation object is invalid based on a detection position of the manipulation object outside the manipulatable region; and
: release the detection invalidation flag and determine a fourth proximity detection of the manipulation object is valid based on the detection position of the manipulation object within the detection invalidity region.

10. The information processing apparatus according to claim 1, wherein the circuitry is further configured to identifiably display the manipulatable region on the display screen based on the manipulation object detected by the circuitry.

11. The information processing apparatus according to claim 1, wherein the circuitry is further configured to control a first detection sensitivity of the proximity detection.

12. The information processing apparatus according to claim 11, wherein the circuitry is further configured to decrease a second detection sensitivity of the proximity detection for first portions of the display screen where the detection of the contact of the manipulation object is enabled,
: wherein the second detection sensitivity becomes lower than a third detection sensitivity of the proximity detection for second portions of the display screen where the detection of the contact of the manipulation object is disabled, and
: wherein the first portions of the display screen are different from the second portions of the display screen.

13. The information processing apparatus according to claim 11, wherein directivity of the first detection sensitivity is based on the proximity detection result.

14. The information processing apparatus according to claim 1, wherein the touch sensor is a capacitive touch panel.

15. The information processing apparatus according to claim 1, wherein the display screen is configured to display a second region that surrounds all detection positions that correspond to the plurality of manipulation objects.

16. The information processing apparatus according to claim 1, wherein the circuitry is further configured to set a second detection sensitivity of the proximity detection for a plurality of first portions of the display screen and a third detection sensitivity of the proximity detection for a plurality of second portions of the display screen,
: wherein the third detection sensitivity is different from the second detection sensitivity, and
: wherein the plurality of first portions and the plurality of second portions are arranged alternatively in the display screen.

17. The information processing apparatus according to claim 1, wherein the circuitry is further configured to set a first priority of a first manipulation object positioned in the manipulatable region higher than a second priority of a second manipulation object positioned outside the manipulatable region.

18. An information processing method, comprising:
generating, by a touch sensor, a sensor signal based on proximity and contact of a manipulation object on a display screen,
wherein the display screen comprises a manipulatable region and a detection invalidity region that lies within the manipulatable region;
detecting, by a circuitry, proximity of the manipulation object based on the sensor signal,
wherein a first proximity detection of the manipulation object in the manipulatable region outside the detection invalidity region is invalid based on a second proximity detection of the manipulation object outside the detection invalidity region prior to the first proximity detection in the manipulatable region outside the detection invalidity region, and
wherein the first proximity detection of the manipulation object in the manipulatable region outside the detection invalidity region is valid based on a third proximity detection of the manipulation object in the detection invalidity region prior to the first proximity detection in the manipulatable region outside the detection invalidity region;
setting, by the circuitry, a priority order among a plurality of manipulation objects based on the proximity detection of the plurality of manipulation objects;
adopting, by the circuitry, a proximity detection result based on the set priority order; and
setting, by the circuitry, a display size of a region corresponding to each manipulation object of the plurality of manipulation objects based on a signal strength of the sensor signal corresponding to each manipulation object of the plurality of manipulation objects.

19. A non-transitory computer readable medium having stored thereon, computer-executable instructions for causing a computer to execute operations, the operations comprising:
detecting proximity of a manipulation object based on a sensor signal generated by a sensor, wherein the sensor generates the sensor signal based on proximity and contact of the manipulation object on a display screen,
wherein the display screen comprises a manipulatable region and a detection invalidity region that lies within the manipulatable region,
wherein a first proximity detection of the manipulation object in the manipulatable region outside the detection invalidity region is invalid based on a second proximity detection of the manipulation object outside the detection invalidity region prior to the first proximity detection in the manipulatable region outside the detection invalidity region, and
wherein the first proximity detection of the manipulation object in the manipulatable region outside the detection invalidity region is valid based on a third proximity detection of the manipulation object in the detection invalidity region prior to the first proximity detection in the manipulatable region outside the detection invalidity region;
setting a priority order among a plurality of manipulation objects, based on the proximity detection of the plurality of manipulation objects;
adopting a proximity detection result based on the set priority order; and
setting a display size of a region corresponding to each manipulation object of the plurality of manipulation objects based on a signal strength of the sensor signal corresponding to each manipulation object of the plurality of manipulation objects.

* * * * *